US012326214B2

(12) United States Patent
Kim et al.

(10) Patent No.: US 12,326,214 B2
(45) Date of Patent: Jun. 10, 2025

(54) AEROGEL COMPOSITE

(71) Applicant: LG Chem, Ltd., Seoul (KR)

(72) Inventors: Mi Ri Kim, Daejeon (KR); Mi Kyoung Jin, Daejeon (KR); Kyoung Shil Oh, Daejeon (KR); Eun Yeong Jin, Daejeon (KR); Taegyeong Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/524,301

(22) Filed: Nov. 30, 2023

(65) Prior Publication Data
US 2025/0075840 A1 Mar. 6, 2025

(30) Foreign Application Priority Data
Aug. 30, 2023 (KR) .................. 10-2023-0114837

(51) Int. Cl.
*C01B 33/158* (2006.01)
*C01B 33/143* (2006.01)
*C01B 33/154* (2006.01)
*D06M 11/79* (2006.01)
*F16L 59/02* (2006.01)
*D06M 101/00* (2006.01)

(52) U.S. Cl.
CPC ........... *F16L 59/028* (2013.01); *D06M 11/79* (2013.01); *D06M 2101/00* (2013.01); *D06M 2400/02* (2013.01)

(58) Field of Classification Search
CPC . C01B 33/145; C01B 33/155; C01B 33/1585; C01B 33/159; F16L 59/026; F16L 59/028
See application file for complete search history.

(56) References Cited

U.S. PATENT DOCUMENTS

| | | | |
|---|---|---|---|
| 2,734,827 | A | 2/1956 | Hooks |
| 7,560,062 | B2 | 7/2009 | Gould et al. |
| 10,759,666 | B2 | 9/2020 | Hindelang et al. |
| 11,577,490 | B2 | 2/2023 | Oikawa et al. |
| 2002/0094426 | A1 | 7/2002 | Stepanian et al. |
| 2010/0143717 | A1 | 6/2010 | Sakamoto et al. |
| 2016/0369059 | A1 | 12/2016 | Kotake et al. |
| 2017/0210092 | A1 | 7/2017 | Rikleen et al. |
| 2017/0283269 | A1 | 10/2017 | Kotake et al. |
| 2018/0086587 | A1 | 3/2018 | Kim et al. |
| 2018/0134566 | A1 | 5/2018 | Kim et al. |
| 2018/0244029 | A1 | 8/2018 | Kim et al. |
| 2018/0313001 | A1 | 11/2018 | Dempsey |
| 2018/0326700 | A1 | 11/2018 | Kim |
| 2019/0062167 | A1 | 2/2019 | Kim et al. |
| 2020/0048100 | A1 | 2/2020 | Yu et al. |
| 2020/0108583 | A1 | 4/2020 | Oikawa et al. |
| 2020/0215791 | A1 | 7/2020 | Oh et al. |
| 2020/0378058 | A1 | 12/2020 | Oikawa et al. |
| 2021/0016239 | A1 | 1/2021 | Kim et al. |
| 2021/0309527 | A1 | 10/2021 | Evans et al. |
| 2021/0363699 | A1 | 11/2021 | Afshari et al. |
| 2021/0370636 | A1 | 12/2021 | Tsuruta et al. |
| 2022/0098046 | A1* | 3/2022 | Lee ................ C01B 33/155 |
| 2022/0195137 | A1 | 6/2022 | Movahhed et al. |
| 2023/0050685 | A1 | 2/2023 | Kim et al. |
| 2023/0331560 | A1 | 10/2023 | Kim et al. |
| 2023/0348285 | A1 | 11/2023 | Numrich et al. |

FOREIGN PATENT DOCUMENTS

| | | |
|---|---|---|
| CN | 101680128 B | 1/2013 |
| CN | 107140938 A | 9/2017 |
| CN | 106565268 B | 1/2020 |
| CN | 113939942 A | 1/2022 |
| CN | 115748088 A | 3/2023 |
| CN | 116154360 A | 5/2023 |
| CN | 116945715 A | 10/2023 |
| EP | 4056539 A1 | 9/2022 |
| JP | WO2017221687 A1 | 1/2019 |
| JP | 2020060291 A | 4/2020 |
| JP | 2021036038 A | 3/2021 |
| JP | 2022529347 A | 6/2022 |
| JP | 7285085 B2 | 6/2023 |
| JP | 7352769 B2 | 9/2023 |
| JP | 7368327 B2 | 10/2023 |
| KR | 100909732 B1 | 7/2009 |
| KR | 101281689 B1 | 7/2013 |
| KR | 20130138275 A | 12/2013 |
| KR | 20150090320 A | 8/2015 |
| KR | 101654795 B1 | 9/2016 |
| KR | 20160125956 A | 11/2016 |
| KR | 20170060027 A | 5/2017 |
| KR | 101748532 B1 | 6/2017 |
| KR | 101752091 B1 | 6/2017 |
| KR | 20170098141 A | 8/2017 |

(Continued)

OTHER PUBLICATIONS

Emmerling, A., and J. Fricke. "Small angle scattering and the structure of aerogels." Journal of non-crystalline solids 145 (Jan. 1992): 113-120. 8 pgs.

Jun-Jie Zhao, et al., "A 3-D numerical heat transfer model for silica aerogels based on the porous secondary nanoparticle aggregate structure", Journal of Non-Crystalline Solids,; vol. 358, Issue 10, (Mar. 2012), pp. 1287-1297.

Yan-Jun Dai, et al., "A Theoretical Model for the Effective Thermal Conductivity of Silica Aerogel Composites", Applied Thermal Engineering, (Sep. 2017). 29 pgs.

International Search Report for Application No. PCT/KR2024/013053 mailed Dec. 19, 2024, 3 pages. [See p. 1, categorizing the cited references].

(Continued)

*Primary Examiner* — Shuangyi Abu Ali

(74) *Attorney, Agent, or Firm* — Lerner David LLP

(57) ABSTRACT

An aerogel composite has excellent thermal stability and flame retardancy even when exposed to a high-temperature environment for a long period of time.

20 Claims, No Drawings

(56) References Cited

FOREIGN PATENT DOCUMENTS

| | | | |
|---|---|---|---|
| KR | 20170132829 A | 12/2017 |
| KR | 20180033064 A | 4/2018 |
| KR | 101911188 B1 | 10/2018 |
| KR | 101928538 B1 | 12/2018 |
| KR | 101966406 B1 | 4/2019 |
| KR | 101993643 B1 | 6/2019 |
| KR | 20200073730 A | 6/2020 |
| KR | 20200095323 A | 8/2020 |
| KR | 102192354 B1 | 12/2020 |
| KR | 20210071508 A | 6/2021 |
| KR | 20210146798 A | 12/2021 |
| KR | 20220049841 A | 4/2022 |
| KR | 20220137360 A | 10/2022 |
| KR | 20220154727 A | 11/2022 |
| KR | 20220164499 A | 12/2022 |
| KR | 20230005300 A | 1/2023 |
| WO | 2017155311 A1 | 9/2017 |
| WO | 2018163354 A1 | 9/2018 |

OTHER PUBLICATIONS

A Klochkov et al., "Pulse NMR of 3He in aerogel at temperature 1.5 K", Journal of Physics: Conference Series 150 (Feb. 2009) 032043. 5 pgs.

Jeong, Sangbae, et al., "Application of Silica Aerogel as an Interlayer Insulating Film", The Korean Ceramic Society, Ceramist, vol. 4, Issue 6, pp. 84-90, Dec. 2001.

International Search Report for Application No. PCT/KR2024/015088 mailed Jan. 16, 2025. 3 pages. (see p. 2-3, categorizing the cited references).

* cited by examiner

AEROGEL COMPOSITE

CROSS-REFERENCE TO RELATED APPLICATION

This application claims priority to Korean Patent Application No. 10-2023-0114837 filed on Aug. 30, 2023, all of the contents of which is incorporated by reference in its entirety.

BACKGROUND

The present disclosure relates to an aerogel composite and the application use thereof as a heat insulation material.

An aerogel is a super-porous, high specific surface area (>500 m²/g) material having a porosity of approximately 90.0% to 99.9% and a pore size in the range of 1 nm to 100 nm, and is a material having excellent properties ultra-light weight/super-heat insulation/ultra-low dielectric, and the like. Accordingly, research on the development of aerogel materials as well as research on the application use thereof as transparent heat insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantage of an aerogel is that the aerogel has super-insulation properties exhibiting thermal conductivity of 0.300 W/m·K or less, which is lower than that of an organic heat insulation material such as conventional Styrofoam.

In general, an aerogel is produced by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional heat insulation material which prevents corrosion by moisture, and is widely used in construction or industrial fields, and in addition, the hydrophobic silica aerogel blanket may be used as a heat insulation material or a thermal insulation material for aircraft, ships, automobiles, batteries, and the like.

However, when the aerogel blanket is installed and applied to the above-mentioned applications, especially high-temperature piping, the aerogel blanket is often exposed to a high-temperature environment for a long period of time, in which case, some components present in the aerogel may be either decomposed or lost, thereby causing a problem in which the aerogel structure is collapsed, or a problem in which physical properties such as insulation or flame retardancy is significantly reduced. Such a problem may also occur when the aerogel blanket is applied to a battery module, and therefore, in terms of safety, even when exposed to a high-temperature environment for a long period of time, the aerogel blanket is required to have excellent thermal stability and maintain high flame retardancy due to a low degree of decomposition or lose of aerogel components.

SUMMARY

The present disclosure provides an aerogel composite with excellent thermal stability and high flame retardancy even when exposed to a high-temperature environment for a long period of time.

However, the technical task to be achieved by the present disclosure is not limited to the aforementioned task, and other tasks that are not mentioned will be clearly understood by those skilled in the art from the following description.

In accordance with some embodiments of the present disclosure, an aerogel composite includes a fiber substrate, and an aerogel including one or more pores, wherein a weight retention rate measured after heating the aerogel composite at a temperature of 300° C. for 5 minutes, 10 minutes, 15 minutes, 20 minutes, 25 minutes, and 30 minutes satisfies Equation 2 below, and a weight retention rate measured after heating the aerogel composite at a temperature of 300° C. for 60 minutes is 97 wt % or greater.

$$A = \{(\text{Weight retention rate measured after heating for } x \text{ time}(a)) - (\text{Average value of weight retention rates after heating } (b))\} / (\text{Average value of weight retention rates after heating } (b)) \times 100 \quad [\text{Equation 2}]$$

In Equation 2 above, the x time is 5 minutes, 10 minutes, 15 minutes, 20 minutes, 25 minutes, or 30 minutes, the weight retention rate measured after heating for the x time (a) is a percentage (%) of the weight of the aerogel composite measured after heating the aerogel composite at a temperature of 300° C. for the x time with respect to the weight of the aerogel composite before heating the same at 300° C., the average value of weight retention rates after heating (b) means an average value of weight retention rates obtained after heating the aerogel composite at a temperature of 300° C. for 5 minutes, 10 minutes, 15 minutes, 20 minutes, 25 minutes, and 30 minutes, and the A is a rational number of −0.50 to +0.50. In some embodiments, A is a rational number of −0.30 to +0.30.

In some embodiments, when the aerogel composite is heated at a temperature of 300° C. for 5 minutes and 60 minutes, an absolute value (B) of the change in weight retention rate of the aerogel composite per unit time may satisfy Equation 3 below.

$$B = |\{(\text{Weight retention rate measured after heating for } y \text{ time}) - (\text{Weight retention rate measured after heating for } z \text{ time})\}/(y-z)| \quad [\text{Equation 3}]$$

In Equation 3 above, the y is 5 minutes, and the z is 60 minutes, the weight retention rate measured after heating for the y time is a percentage (%) of the weight of the aerogel composite measured after heating the aerogel composite at a temperature of 300° C. for the y time with respect to the weight of the aerogel composite before heating the same at 300° C., the weight retention rate measured after heating for the z time is a percentage (%) of the weight of the aerogel composite measured after heating the aerogel composite at a temperature of 300° C. for the z time with respect to the weight of the aerogel composite before heating the same at 300° C., and the B is a rational number of $1.0 \times 10^{-3}$ to $4.0 \times 10^{-2}$.

In some embodiments, when the aerogel composite is heated at a temperature of 300° C. for 5 minutes and 30 minutes, an absolute value (B) of the change in weight retention rate of the aerogel composite per unit time may satisfy Equation 3 below.

$$B = |\{(\text{Weight retention rate measured after heating for } y \text{ time}) - (\text{Weight retention rate measured after heating for } z \text{ time})\}/(y-z)| \quad [\text{Equation 3}]$$

In Equation 3 above, the y is 5 minutes, and the z is 30 minutes, the weight retention rate measured after heating for the y time is a percentage (%) of the weight of the aerogel composite measured after heating the aerogel composite at a temperature of 300° C. for the y time with respect to the weight of the aerogel composite before heating the same at 300° C., the weight retention rate measured after heating for the z time is a percentage (%) of the weight of the aerogel composite measured after heating the aerogel composite at a temperature of 300° C. for the z time with respect to the weight of the aerogel composite before heating the same at 300° C., and the B is a rational number of $1.0 \times 10^{-3}$ to $3.0 \times 10^{-2}$.

The aerogel composite may have a moisture impregnation rate of 5 wt % or less, which is represented by Equation 4 below. In some embodiments, the moisture impregnation rate is 2 wt % or less.

$$\text{Moisture impregnation rate (wt \%)} = \{(\text{Weight of specimen after impregnation} - \text{Weight of specimen before impregnation})/(\text{Weight of specimen before impregnation})\} \times 100 \quad [\text{Equation 4}]$$

In Equation 4 above, the weight of a specimen after impregnation means the weight measured after impregnating an aerogel composite specimen in distilled water at 21±2° C. for 15 minutes.

In the aerogel composite, a weight retention rate measured after heating the aerogel composite at a temperature of 300° C. for 30 minutes is 97 wt % or greater.

In the aerogel composite, the average heat for sustained burning (Qsb) measured in accordance with the ISO 5658-2 standard may be 0.5 MJ/m² or greater.

In the aerogel composite, the critical flux at extinguishment (CHF) measured in accordance with the ISO 5658-2 standard may be 25 kW/m² or greater.

The aerogel composite may have a thermal conductivity at room temperature (23±5° C.) of 15.0 mW/mK or less.

The aerogel composite may have a thermal conductivity at 150° C. of 25.0 mW/mK or less.

When the aerogel composite is heated at a temperature of 150° C. for 60 minutes, the amount of ammonia gas generated per unit weight of the aerogel composite may be 10 µg/g to 70 µg/g. In some embodiments, the amount of ammonia gas generated per unit weight of the aerogel composite may be 10 µg/g to 50 µg/g. In some embodiments, ammonium bicarbonate ($NH_4HCO_3$) or ammonium carbonate (($NH_4)_2CO_3$) particles are included on the aerogel or in pores inside the aerogel such that ammonia gas generated from the aerogel composite is generated in the above range the aerogel composite is heated at a temperature of 150° C. for 60 minutes.

In accordance with some embodiments of the present disclosure, a heat insulation member includes the aerogel composite provided in the present disclosure.

The heat insulation member may further include a support member positioned on at least one surface of an upper surface or a lower surface of the aerogel composite.

DETAILED DESCRIPTION

Terms and words used in the specification and claims shall not be construed as limited to ordinary or dictionary terms and should be construed in a sense and concept consistent with the technical idea of the present disclosure, based on the principle that an inventor may properly define the meaning of the words or terms in the best way possible to explain the invention.

In accordance with some embodiments of the present disclosure, an aerogel composite includes a fiber substrate, and an aerogel including one or more pores.

In the present disclosure, an "aerogel" includes a three-dimensional network structure in which a plurality of aerogel particles having a size of approximately 2 nm to 20 nm are agglomerated or combined to form a plurality of open pores.

In the present disclosure, an aerogel may be an inorganic silica aerogel formed from a silicon alkoxide-based compound or water glass as a precursor. In some embodiments, the aerogel may include silica, methylsilylated silica, dimethylsilylated silica, trimethylsilylated silica, or mixtures thereof. In some embodiments, the aerogel may be an aerogel in which at least portion of $SiO_2$ on a surface of a $SiO_2$ network has a bond structure Si—O—$SiO_2(CH_3)$, Si—O—$SiO(CH_3)_2$ or Si—O—$Si(CH_3)_3$. A specific process for producing a silica aerogel will be described in detail below.

In the present disclosure, the "aerogel particle" is a particle in the form of an individual solid unit constituting an aerogel, and may be powder, a bead, a fine powder material, a granule, a pellet, an agglomerate, a fiber, a flake, and the like, and the shape thereof may be spherical, hemispherical, circular, semicircular, polygonal, cubical, rodlike, polyhedral, irregular, and the like. In the present disclosure, the aerogel particles may have an average particle diameter of approximately 10 nm to 2000 nm, 10 nm to 1500 nm, or 10 nm to 1000 nm, but are not limited thereto. In the present disclosure, the average particle size may be measured by any means known to those skilled in the art, such as scanning electron microscopy, dynamic light scattering, optical microscopy, size exclusion, or the like, but is not limited thereto.

In the present disclosure, the aerogel may have a skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. In one embodiment, the aerogel of the present disclosure may include mesopores. In one embodiment, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

In the present disclosure, the porosity of the aerogel may be 80% or greater, 85% or greater, 88% or greater, 89% or greater, 90% or greater, 91% or greater, 92% or greater, 93% or greater, 94% or greater, 95% or greater, 96% or greater, 97% or greater, 98% or greater, or 99% or greater, preferably 80% or greater, or 99.9% or less, but is not limited thereto.

The aerogel composite of the present disclosure has a structure in which at least some of a plurality of aerogel particles are dispersed, preferably combined, on the surface of a substrate including a fiber, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil® (manufactured by Saffil), Durablanket® (manufactured by Unifrax) and other silica fibers, Duraback® (manufactured by Carborundum), a polyaramid fiber such as Kevlar®, Nomex®, and Sontera® (all manufactured by DuPont), CONEX (manufactured by Taijin), a polyolefin such as Tyvek® (manufactured by DuPont), Dyneema® (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Gore-Tex® (manufactured by W.L. GORE), a silicon carbide fiber such as NICALCON (manufactured by COI Ceramics), a ceramic fiber such as NEXTEL (manufactured by 3M), an acrylic polymer, wool, silk, hemp, leather, a suede fiber, a PBOfiber Zylon® (manufactured by Toyobo), a liquid crystal material such as VECTAN (manufactured by Hoechst), a cambrel fiber (manufactured by DuPont), polyurethane, polyamide, a wool fiber, boron, aluminum, iron, a stainless steel fiber and other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance.

In the present disclosure, the thickness of the fiber substrate may be 0.5 nm to 20 mm, but is not limited thereto.

In the aerogel composite of the present disclosure, ammonium bicarbonate ($NH_4HCO_3$) or ammonium carbonate (($NH_4)_2CO_3$) particles may be included on the aerogel or in pores inside the aerogel. When the aerogel composite provided in the present disclosure is exposed to a high temperature of 150° C. or higher, ammonium bicarbonate or ammonium carbonate present on the aerogel is pyrolyzed into ammonia gas, carbon dioxide, and water vapor. Therefore, the amount of ammonium bicarbonate ($NH_4HCO_3$) or ammonium carbonate (($NH_4)_2CO_3$) included in the aerogel may be confirmed by measuring the amount of ammonia gas generated at a high temperature of 150° C. or higher.

The aerogel composite provided in the present disclosure is allowed to contain ammonium bicarbonate ($NH_4HCO_3$) or ammonium carbonate (($NH_4)_2CO_3$) particles in an amount of a specific range, so that the aerogel composite may have excellent flame retardancy without the addition of a separate flame retardant in a production process.

In order to secure the above effect, it is preferable that the aerogel composite provided in the present disclosure contains ammonium bicarbonate ($NH_4HCO_3$) or ammonium carbonate (($NH_4)_2CO_3$) such that the ammonia gas generated from the aerogel composite is generated in the following range when the aerogel composite is heated at a temperature of 150° C. for 60 minutes. Specifically, when the aerogel composite provided in the present disclosure is heated at a temperature of 150° C. for 60 minutes, the amount of ammonia gas generated per unit weight of the aerogel composite may be 10 μg/g or greater, 15 μg/g or greater, 20 g/g or greater, 25 μg/g or greater, 30 μg/g or greater, or 35 μg/g or greater, and may be 90 μg/g or less, 80 μg/g or less, 70 μg/g or less, 60 μg/g or less, 50 μg/g or less, 40 g/g or less, 30 μg/g or less, 20 μg/g or less, or 15 μg/g or less. Preferably, the amount of ammonia gas generated per unit weight of the aerogel composite may be g/g to 90 μg/g, 10 μg/g to 80 μg/g, 10 μg/g to 70 μg/g, 10 μg/g to 60 μg/g, 10 g/g to 50 μg/g, 10 μg/g to 40 μg/g, 15 μg/g to 40 μg/g, 20 μg/g to 40 μg/g, 30 μg/g to 40 μg/g, or 35 μg/g to 40 μg/g. In some embodiments, the amount of ammonia gas generated per unit weight of the aerogel composite is 10 μg/g to 70 μg/g. In some embodiments, the amount of ammonia gas generated per unit weight of the aerogel composite is 10 μg/g to 60 μg/g. In some embodiments, the amount of ammonia gas generated per unit weight of the aerogel composite is 10 μg/g to 50 μg/g.

When the aerogel composite provided in the present disclosure contains ammonium bicarbonate ($NH_4HCO_3$), ammonium carbonate (($NH_4)_2CO_3$), or a mixture thereof, the ammonium bicarbonate ($NH_4HCO_3$), the ammonium carbonate (($NH_4)_2CO_3$), or the mixture thereof may be 30 ppm or greater, 40 ppm or greater, 50 ppm or greater, 55 ppm or greater, 60 ppm or greater, 65 ppm or greater, 70 ppm or greater, 75 ppm or greater, 80 ppm or greater, 85 ppm or greater, 90 ppm or greater, 95 ppm or greater, 100 ppm or greater, 105 ppm or greater, 110 ppm or greater, 115 ppm or greater, 120 ppm or greater, 125 ppm or greater, 130 ppm or greater, 135 ppm or greater, 140 ppm or greater, 145 ppm or greater, 150 ppm or greater, 155 ppm or greater, 160 ppm or greater, 165 ppm or greater, 170 ppm or greater, or 175 ppm or greater, and 300 ppm or less, 280 ppm or less, 260 ppm or less, 240 ppm or less, 220 ppm or less, 200 ppm or less, 190 ppm or less, 180 ppm or less, 170 ppm or less, 160 ppm or less, 150 ppm or less, 140 ppm or less, 130 ppm or less, 120 ppm or less, 110 ppm or less, 100 ppm or less, 90 ppm or less, 80 ppm or less, 70 ppm or less, or 60 ppm or less. Preferably, the ammonium bicarbonate ($NH_4HCO_3$), the ammonium carbonate (($NH_4)_2CO_3$), or the mixture thereof may be included in the aerogel composite in an amount of 30 ppm to 300 ppm, 40 ppm to 300 ppm, 50 ppm to 300 ppm, 50 ppm to 280 ppm, 50 ppm to 260 ppm, 50 ppm to 240 ppm, or 50 ppm to 220 ppm. In some embodiments, the ammonium bicarbonate ($NH_4HCO_3$), the ammonium carbonate (($NH_4)_2CO_3$), or the mixture thereof may be included in the aerogel composite in an amount of 50 ppm to 280 ppm. In some embodiments, the ammonium bicarbonate ($NH_4HCO_3$), the ammonium carbonate (($NH_4)_2CO_3$), or the mixture thereof may be included in the aerogel composite in an amount of 50 ppm to 260 ppm. In some embodiments, the ammonium bicarbonate ($NH_4HCO_3$), the ammonium carbonate (($NH_4)_2CO_3$), or the mixture thereof may be included in the aerogel composite in an amount of 50 ppm to 240 ppm. In some embodiments, the ammonium bicarbonate ($NH_4HCO_3$), the ammonium carbonate (($NH_4)_2CO_3$), or the mixture thereof may be included in the aerogel composite in an amount of 50 ppm to 220 ppm.

When the aerogel composite provided in the present disclosure contains ammonium bicarbonate ($NH_4HCO_3$), the ammonium bicarbonate ($NH_4HCO_3$) may be 30 ppm or greater, 40 ppm or greater, 50 ppm or greater, 55 ppm or greater, 60 ppm or greater, 65 ppm or greater, 70 ppm or greater, 75 ppm or greater, 80 ppm or greater, 85 ppm or greater, 90 ppm or greater, 95 ppm or greater, 100 ppm or greater, 105 ppm or greater, 110 ppm or greater, 115 ppm or greater, 120 ppm or greater, 125 ppm or greater, 130 ppm or greater, 135 ppm or greater, 140 ppm or greater, 145 ppm or greater, 150 ppm or greater, 155 ppm or greater, 160 ppm or greater, 165 ppm or greater, 170 ppm or greater, or 175 ppm or greater, and 300 ppm or less, 280 ppm or less, 260 ppm or less, 240 ppm or less, 220 ppm or less, 200 ppm or less, 190 ppm or less, 180 ppm or less, 170 ppm or less, 160 ppm or less, 150 ppm or less, 140 ppm or less, 130 ppm or less, 120 ppm or less, 110 ppm or less, 100 ppm or less, 90 ppm or less, 80 ppm or less, 70 ppm or less, or 60 ppm or less in the aerogel composite. Preferably, the ammonium bicarbonate ($NH_4HCO_3$) may be included in the aerogel composite in an amount of 30 ppm to 300 ppm, 40 ppm to 300 ppm, 40 ppm to 200 ppm, 50 ppm to 200 ppm, 40 ppm to 190 ppm, 50 ppm to 190 ppm, 40 ppm to 180 ppm, 50 ppm to 180 ppm, 60 ppm to 180 ppm, 70 ppm to 180 ppm, 80 ppm to 180 ppm, 90 ppm to 180 ppm, 100 ppm to 180 ppm, 110 ppm to 180 ppm, 120 ppm to 180 ppm, 130 ppm to 180 ppm, 140 ppm to 180 ppm, 150 ppm to 180 ppm, 160 ppm to 180 ppm, or 170 ppm to 180 ppm. In some embodiments, the ammonium bicarbonate ($NH_4HCO_3$) may be included in the aerogel composite in an amount of 40 ppm to 300 ppm. In some embodiments, the ammonium bicarbonate ($NH_4HCO_3$) may be included in the aerogel composite in an amount of 40 ppm to 200 ppm. In some embodiments, the ammonium bicarbonate ($NH_4HCO_3$) may be included in the aerogel composite in an amount of 50 ppm to 200 ppm. In some embodiments, the ammonium bicarbonate ($NH_4HCO_3$) may be included in the aerogel composite in an amount of 40 ppm to 190 ppm.

When the aerogel composite provided in the present disclosure contains ammonium carbonate (($NH_4)_2CO_3$), the ammonium carbonate (($NH_4)_2CO_3$) may be 30 ppm or greater, 40 ppm or greater, 50 ppm or greater, 60 ppm or greater, 70 ppm or greater, 80 ppm or greater, 90 ppm or greater, 100 ppm or greater, 110 ppm or greater, 120 ppm or greater, 130 ppm or greater, 140 ppm or greater, 150 ppm or greater, 160 ppm or greater, 170 ppm or greater, 180 ppm or greater, 190 ppm or greater, 200 ppm or greater, or 210 ppm or greater, and 300 ppm or less, 280 ppm or less, 260 ppm or less, 240 ppm or less, 220 ppm or less, 200 ppm or less, 190 ppm or less, 180 ppm or less, 170 ppm or less, 160 ppm or less, 150 ppm or less, 140 ppm or less, 130 ppm or less, 120 ppm or less, 110 ppm or less, 100 ppm or less, 90 ppm or less, 80 ppm or less, 70 ppm or less, or 60 ppm or less in the aerogel composite. Preferably, the ammonium carbonate (($NH_4)_2CO_3$) may be included in the aerogel composite in an amount of 30 ppm to 300 ppm, 40 ppm to 300 ppm, 50 ppm to 300 ppm, 50 ppm to 280 ppm, 50 ppm to 260 ppm, 50 ppm to 240 ppm, 50 ppm to 220 ppm, 60 ppm to 220 ppm, 70 ppm to 220 ppm, 80 ppm to 220 ppm, 90 ppm to 220 ppm, 100 ppm to 220 ppm, 120 ppm to 220 ppm, 140 ppm to 220 ppm, 160 ppm to 220 ppm, 180 ppm to 220 ppm, or 200 ppm to 220 ppm. In some embodiments, the ammonium carbonate (($NH_4)_2CO_3$) may be included in the aerogel composite in an amount of 50 ppm to 300 ppm. In some embodiments, the ammonium carbonate (($NH_4)_2CO_3$) may be included in the aerogel composite in an amount of 50 ppm to 280 ppm. In some embodiments, the ammonium carbonate (($NH_4)_2CO_3$) may be included in the aerogel composite in an amount of 50 ppm to 260 ppm. In some embodiments, the ammonium carbonate (($NH_4)_2CO_3$) may be included in the aerogel composite in an amount of 50 ppm to 240 ppm.

Here, the content of ammonium bicarbonate ($NH_4HCO_3$) or ammonium carbonate (($NH_4)_2CO_3$) described above may correspond to the amount of ammonia gas generation described above.

In the present disclosure, when ammonium bicarbonate ($NH_4HCO_3$) or ammonium carbonate (($NH_4)_2CO_3$) is included in the aerogel composite in an amount less than the content range described above, sufficient flame retardancy may not be secured, and when included in an amount greater than the content range described above, water repellency may be low and thermal stability may be degraded.

In the present disclosure, the amount of ammonia gas generation may be measured using a headspace-gas chromatography (GC)/nitrogen chemiluminescence detector (NCD) after heating an aerogel composite specimen having a size of 1×1 $cm^2$ at a temperature of 150° C. for 60 minutes, but the present disclosure is not limited thereto. In addition, when performing a quantitative analysis as described above, calibration may be performed by one-point calibration using one standard product or five-point calibration by creating a calibration curve, without preparing a separate calibration curve, and for example, may be performed by one-point calibration based on a value corresponding to $NH_3$, and 14 g, but the present disclosure is not limited thereto.

In addition, in the present disclosure, the amount of ammonia gas generation may be obtained by randomly obtaining a total of five square specimens having a size of 1 cm×1 cm from the aerogel composite, and then calculating an average value of the amount of ammonia generated (g/g) per unit weight of the specimen obtained from each specimen. At this time, the five specimens may be obtained by obtaining four specimens by positioning a position, which is spaced apart by 10 cm in a center direction from each corner of an aerogel composite manufactured in a rectangular shape, at the exact center of a specimen, and obtaining one specimen by positioning the exact central portion of the aerogel composite at the exact center of a specimen.

In addition, the aerogel composite provided in the present disclosure has a small amount of weight loss of the aerogel composite since ammonium bicarbonate ($NH_4HCO_3$) or ammonium carbonate (($NH_4)_2CO_3$) is first vaporized at a high temperature of 150° C. or higher, and has high hydrophobicity, and thus, has excellent thermal stability at high temperatures. Specifically, even when the aerogel composite is exposed to a high temperature of 300° C. for a long period of time, the rate of change in weight of the aerogel composite is small, and is maintained constant within a specific range, so that the thermal insulation performance may also be maintained at an excellent level without significant degradation.

In the present specification, the "weight retention rate" is a ratio of the weight of the aerogel composite measured after heating the aerogel composite for a predetermined time at a temperature of 150° C. or higher, preferably at a temperature of 300° C., with respect to the weight of the aerogel composite before heating represented as a percentage, as shown in Equation 1 below. Here, the predetermined time may be, for example, 1 minute or more, 5 minutes or more, 10 minutes or more, 20 minutes or more, 25 minutes or more, 30 minutes or more, 40 minutes or more, 50 minutes or more, 60 minutes or more, 70 minutes or more, 80 minutes or more, 90 minutes or more, 2 hours or more, 4 hours or more, or 6 hours or more, and 12 hours or less, 6 hours or less, 4 hours or less, 2 hours or less, 90 minutes or less, 80 minutes or less, 70 minutes or less, 60 minutes or less, 40 minutes or less, 30 minutes or less, 20 minutes or less, 10 minutes or less, or 5 minutes or less, and one example thereof may be 5 minutes to 30 minutes, and another example thereof may be 5 minutes, 10 minutes, 15 minutes, 20 minutes, 25 minutes, or 30 minutes, but the present disclosure is not limited thereto.

$$\text{Weight retention rate of aerogel composite after heating (wt \%)} = \{(\text{Weight of aerogel composite after heating})/(\text{Weight of aerogel composite before heating})\} \times 100 \quad [\text{Equation 1}]$$

The weight retention rate measured after heating the aerogel composite of the present disclosure at a temperature of 300° C. for any selected time among 5 minutes to 30 minutes may satisfy Equation 2 below.

$$A(\%) = \{(\text{Weight retention rate measured after heating for } x \text{ time}(a)) - (\text{Average value of weight retention rates after heating }(b))\}/(\text{Average value of weight retention rates after heating }(b)) \times 100 \quad [\text{Equation 2}]$$

In Equation 2 above, the "x time" means any time of 5 minutes to 30 minutes, and the unit of time may be 'minute.' For example, the "x time" may be 5 minutes, 10 minutes, 15 minutes, 20 minutes, 25 minutes, or 30 minutes, but is not limited thereto.

In addition, the "weight retention rate measured after heating for the x time (a)" is a percentage (%) of the weight of the aerogel composite measured after heating the aerogel composite at a temperature of 300° C. for the x time with respect to the weight of the aerogel composite before heating the same at 300° C.

In addition, the "average value of weight retention rates after heating (b)" means an average value of weight retention rates of the aerogel composite obtained after heating the aerogel composite at a temperature of 300° C. for at least two selected continuous time among 5 minutes to 30 minutes. In some embodiments, the "average value of weight retention rates after heating (b)" may mean an average value of weight retention rates of the aerogel composite obtained after heating the aerogel composite at 300° C. for at least two selected continuous time among 5 minutes, 10 minutes, 15 minutes, 20 minutes, 25 minutes, and 30 minutes with respect to the weight of the aerogel composite before heating.

The A may be a rational number which falls within the range of −0.50 to +0.50, −0.40 to +0.40, −0.35 to +0.35, −0.30 to +0.30, −0.29 to +0.29, −0.28 to +0.28, −0.27 to +0.27, −0.26 to +0.26, −0.25 to +0.25, −0.24 to +0.24, −0.23 to +0.23, −0.22 to +0.22, −0.21 to +0.21, −0.20 to +0.20, −0.19 to +0.19, −0.18 to +0.18, −0.17 to +0.17, −0.16 to +0.16, −0.15 to +0.15, −0.14 to +0.14, −0.13 to +0.13, −0.12 to +0.12, −0.11 to +0.11, or −0.10 to +0.10. In some embodiments, the A may be a rational number of from −0.40 to +0.40. In some embodiments, the A may be a rational number of from −0.35 to +0.35. In some embodiments, the A may be a rational number of from −0.30 to +0.30. In some embodiments, the A may be a rational number of from −0.25 to +0.25.

In some embodiments, the weight retention rate of the aerogel composite measured after heating the aerogel composite at 300° C. for 5 minutes, 10 minutes, 15 minutes, 20 minutes, 25 minutes, or 30 minutes may satisfy Equation 2 above. At this time, the average value of weight retention rates after heating (b) may mean an average value of weight retention rates of the aerogel composite obtained after heating the aerogel composite at 300° C. for at least two selected time among 5 minutes, 10 minutes, 15 minutes, 20 minutes, 25 minutes, and 30 minutes.

In some embodiments, the weight retention rate of the aerogel composite measured after heating the aerogel composite at 300° C. for 5 minutes or 30 minutes may satisfy Equation 2 above. At this time, the average value of weight retention rates after heating (b) may mean an average value of weight retention rates of the aerogel composite obtained after heating the aerogel composite at 300° C. for at least two selected time among 5 minutes, 10 minutes, 15 minutes, 20 minutes, 25 minutes, and 30 minutes. In some embodiments, the A maybe a rational number of from −0.35 to +0.35. In some embodiments, the A maybe a rational number of from −0.30 to +0.30. In some embodiments, the A maybe a rational number of from −0.25 to +0.25.

In some embodiments, the weight retention rate of the aerogel composite measured after heating the aerogel composite at 300° C. for each of 5 minutes and 30 minutes may satisfy Equation 2 above. At this time, the average value of weight retention rates after heating (b) may mean an average value of weight retention rates of the aerogel composite obtained after heating the aerogel composite at 300° C. for at least two selected time among 5 minutes, 10 minutes, 15 minutes, 20 minutes, 25 minutes, and 30 minutes. In some embodiments, the A maybe a rational number of from −0.30 to +0.30. In some embodiments, the A maybe a rational number of from −0.25 to +0.25.

In some embodiments, the weight retention rate of the aerogel composite measured after heating the aerogel composite at 300° C. for 5 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.35 to +0.35. In some embodiments, the A maybe a rational number of from −0.30 to +0.30. In some embodiments, the A maybe a rational number of from −0.25 to +0.25. In some embodiments, the A maybe a rational number of from 0 to +0.35. In some embodiments, the A maybe a rational number of from 0 to +0.30. In some embodiments, the A maybe a rational number of from 0 to +0.25.

In some embodiments, the weight retention rate of the aerogel composite measured after heating the aerogel composite at 300° C. for 10 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.10 to +0.10. In some embodiments, the A maybe a rational number of from 0 to +0.15.

In some embodiments, the weight retention rate of the aerogel composite measured after heating the aerogel composite at 300° C. for 15 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.10 to +0.10. In some embodiments, the A maybe a rational number of from −0.05 to +0.05.

In some embodiments, the weight retention rate of the aerogel composite measured after heating the aerogel composite at 300° C. for 20 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.10 to +0.10. In some embodiments, the A maybe a rational number of from −0.10 to 0.

In some embodiments, the weight retention rate of the aerogel composite measured after heating the aerogel composite at 300° C. for 25 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.20 to +0.20. In some embodiments, the A maybe a rational number of from −0.15 to +0.15. In some embodiments, the A maybe a rational number of from −0.20 to 0. In some embodiments, the A maybe a rational number of from −0.15 to 0.

In some embodiments, the weight retention rate of the aerogel composite measured after heating the aerogel composite at 300° C. for 30 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.30 to +0.30. In some embodiments, the A maybe a rational number of from −0.20 to +0.20. In some embodiments, the A maybe a rational number of from −0.15 to +0.15. In some embodiments, the A maybe a rational number of from −0.30 to 0. In some embodiments, the A maybe a rational number of from −0.20 to 0. In some embodiments, the A maybe a rational number of from −0.15 to 0.

In some embodiments, the weight retention rate of the aerogel composite measured after heating the aerogel composite at 300° C. for each of 5 minutes and 30 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes.

In some embodiments, the weight retention rate of the aerogel composite measured after heating the aerogel composite at 300° C. for each of 5 minutes and 30 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.50 to +0.50. In some embodiments, the A maybe a rational number of from −0.40 to +0.40. In some embodiments, the A maybe a rational number of from −0.35 to +0.35. In some embodiments, the A maybe a rational number of from −0.30 to +0.30. In some embodiments, the A maybe a rational number of from −0.25 to +0.25.

In some embodiments, the weight retention rate of the aerogel composite measured after heating the aerogel composite at 300° C. for each of 5 minutes, 10 minutes, 15 minutes, 20 minutes, 25 minutes, and 30 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes.

In some embodiments, the weight retention rate of the aerogel composite measured after heating the aerogel composite at 300° C. for each of 5 minutes, 10 minutes, 15 minutes, 20 minutes, 25 minutes, and 30 minutes may satisfy Equation 2 above. At this time, the average value of weight retention rates after heating (b) may mean an average value of weight retention rates of the aerogel composite obtained after heating the aerogel composite at 300° C. for each of 5 minutes, 10 minutes, 15 minutes, 20 minutes, 25 minutes, and 30 minutes. In some embodiments, the A maybe a rational number of from −0.50 to +0.50. In some embodiments, the A maybe a rational number of from −0.40 to +0.40. In some embodiments, the A maybe a rational number of from −0.35 to +0.35. In some embodiments, the A maybe a rational number of from −0.30 to +0.30. In some embodiments, the A maybe a rational number of from −0.25 to +0.25.

In addition, when heating the aerogel composite provided in the present disclosure to a temperature of 300° C., an absolute value (B) of the change in weight retention rate of the aerogel composite per unit time may satisfy Equation 3 below.

$$B = |\{(\text{Weight retention rate measured after heating for } y \text{ time}) - (\text{Weight retention rate measured after heating for } z \text{ time})\}/(y - z)| \quad [\text{Equation 3}]$$

In Equation 3 above, y and z are each independently a selected time value among 5 minutes to 60 minutes, and are different from each other. At this time, the unit of time may be 'minute.'

In addition, the "weight retention rate measured after heating for the y time" and the "weight retention rate measured after heating for the z time" each mean a percentage (%) of the weight of the aerogel composite measured after heating the aerogel composite at a temperature of 300° C. for the y time or z time with respect to the weight of the aerogel composite before heating according to Equation 1.

In addition, the B may be a rational number which falls within the range of $1.0 \times 10^{-3}$ to $5.0 \times 10^{-2}$, $1.0 \times 10^{-3}$ to $4.5 \times 10^{-2}$, $1.0 \times 10^{-3}$ to $4.0 \times 10^{-2}$, $1.0 \times 10^{-3}$ to $3.5 \times 10^{-2}$, $1.0 \times 10^{-3}$ to $3.0 \times 10^{-2}$, $1.5 \times 10^{-3}$ to $4.0 \times 10^{-2}$, $1.5 \times 10^{-3}$ to $3.0 \times 10^{-2}$, $2.0 \times 10^{-3}$ to $4.0 \times 10^{-2}$, $2.0 \times 10^{-3}$ to $3.0 \times 10^{-2}$, $2.5 \times 10^{-3}$ to $4.0 \times 10^{-2}$, $2.5 \times 10^{-3}$ to $3.0 \times 10^{-2}$, $3.0 \times 10^{-3}$ to $4.0 \times 10^{-2}$, $3.0 \times 10^{-3}$ to $3.0 \times 10^{-2}$, $3.0 \times 10^{-3}$ to $2.5 \times 10^{-2}$, $3.0 \times 10^{-3}$ to $2.0 \times 10^{-2}$, $3.0 \times 10^{-3}$ to $2.0 \times 10^{-2}$, $2.5 \times 10^{-3}$ to $2.0 \times 10^{-2}$, $2.0 \times 10^{-3}$ to $2.0 \times 10^{-2}$, or $3.0 \times 10^{-3}$ to $2.0 \times 10^{-2}$. In some embodiments, the B may be a rational number of from $1.0 \times 10^{-3}$ to $5.0 \times 10^{-2}$. In some embodiments, the B may be a rational number of from $1.0 \times 10^{-3}$ to $4.5 \times 10^{-2}$. In some embodiments, the B may be a rational number of from $1.0 \times 10^{-3}$ to $4.0 \times 10^{-2}$.

In some embodiments, in Equation 3 above, the x may be 5 minutes, and y may be 30 minutes, or the x may be 30 minutes, and the y may be 5 minutes. In some embodiments, the B may be a rational number of from $1.0 \times 10^{-3}$ to $3.0 \times 10^{-2}$. In some embodiments, the B may be a rational number of from $1.5 \times 10^{-3}$ to $3.0 \times 10^{-2}$. In some embodiments, the B may be a rational number of from $2.0 \times 10^{-3}$ to $3.0 \times 10^{-2}$. In some embodiments, the B may be a rational number of from $2.5 \times 10^{-3}$ to $3.0 \times 10^{-2}$. In some embodiments, the B may be a rational number of from $3.0 \times 10^{-3}$ to $3.0 \times 10^{-2}$. In some embodiments, the B may be a rational number of from $3.0 \times 10^{-3}$ to $2.5 \times 10^{-2}$. In some embodiments, the B may be a rational number of from $3.0 \times 10^{-3}$ to $2.0 \times 10^{-2}$. In some embodiments, the B may be a rational number of from $3.5 \times 10^{-3}$ to $2.0 \times 10^{-2}$. In some embodiments, the B may be a rational number of from $4.0 \times 10^{-3}$ to $2.0 \times 10^{-2}$.

In some embodiments, in Equation 3 above, the x may be 5 minutes, and y may be 40 minutes, or the x may be 40 minutes, and the y may be 5 minutes. In some embodiments, the B may be a rational number of from $1.0 \times 10^{-3}$ to $3.0 \times 10^{-2}$. In some embodiments, the B may be a rational number of from $1.5 \times 10^{-3}$ to $3.0 \times 10^{-2}$. In some embodiments, the B may be a rational number of from $2.0 \times 10^{-3}$ to $3.0 \times 10^{-2}$. In some embodiments, the B may be a rational number of from $2.5 \times 10^{-3}$ to $3.0 \times 10^{-2}$. In some embodiments, the B may be a rational number of from $3.0 \times 10^{-3}$ to $3.0 \times 10^{-2}$. In some embodiments, the B may be a rational number of from $3.0 \times 10^{-3}$ to $2.5 \times 10^{-2}$. In some embodiments, the B may be a rational number of from $3.0 \times 10^{-3}$ to $2.0 \times 10^{-2}$. In some embodiments, the B may be a rational number of from $3.5 \times 10^{-3}$ to $2.0 \times 10^{-2}$. In some embodiments, the B may be a rational number of from $4.0 \times 10^{-3}$ to $2.0 \times 10^{-2}$.

In some embodiments, in Equation 3 above, the x may be 5 minutes, and y may be 50 minutes, or the x may be 50 minutes, and the y may be 5 minutes. In some embodiments, the B may be a rational number of from $2.0 \times 10^{-3}$ to $3.0 \times 10^{-2}$. In some embodiments, the B may be a rational number of from $2.5 \times 10^{-3}$ to $3.0 \times 10^{-2}$. In some embodiments, the B may be a rational number of from $3.0 \times 10^{-3}$ to $3.0 \times 10^{-2}$. In some embodiments, the B may be a rational number of from $3.0 \times 10^{-3}$ to $2.5 \times 10^{-2}$. In some embodiments, the B may be a rational number of from $3.0 \times 10^{-3}$ to $2.0 \times 10^{-2}$. In some embodiments, the B may be a rational number of from $3.5 \times 10^{-3}$ to $2.0 \times 10^{-2}$. In some embodiments, the B may be a rational number of from $4.0 \times 10^{-3}$ to $2.0 \times 10^{-2}$. In some embodiments, the B may be a rational number of from $4.5 \times 10^{-3}$ to $2.0 \times 10^{-2}$. In some embodiments, the B may be a rational number of from $4.0 \times 10^{-3}$ to $1.5 \times 10^{-2}$. In some embodiments, the B may be a rational number of from $4.5 \times 10^{-3}$ to $1.5 \times 10^{-2}$.

As an example, in Equation 3 above, the x may be 5 minutes, and y may be 60 minutes, or the x may be 60 minutes, and the y may be 5 minutes. In some embodiments, the B may be a rational number of from $2.0 \times 10^{-3}$ to $3.0 \times 10^{-2}$. In some embodiments, the B may be a rational number of from $2.5 \times 10^{-3}$ to $3.0 \times 10^{-2}$. In some embodiments, the B may be a rational number of from $3.0 \times 10^{-3}$ to $3.0 \times 10^{-2}$. In some embodiments, the B may be a rational number of from $3.0 \times 10^{-3}$ to $2.5 \times 10^{-2}$. In some embodiments, the B may be a rational number of from $3.0 \times 10^{-3}$ to $2.0 \times 10^{-2}$. In some embodiments, the B may be a rational number of from $3.5 \times 10^{-3}$ to $2.0 \times 10^{-2}$. In some embodiments, the B may be a rational number of from $4.0 \times 10^{-3}$ to $2.0 \times 10^{-2}$. In some embodiments, the B may be a rational number of from $4.5 \times 10^{-3}$ to $2.0 \times 10^{-2}$. In some embodiments, the B may be a rational number of from $4.0 \times 10^{-3}$ to $1.5 \times 10^{-2}$. In some embodiments, the B may be a rational number of from $4.5 \times 10^{-3}$ to $1.5 \times 10^{-2}$.

In the present disclosure, the aerogel composite may have a weight retention rate of 97% or greater, 98% or greater, or 99% greater as measured after heating the aerogel composite for 30 minutes.

In the present disclosure, the aerogel composite may have a weight retention rate of 96.5% or greater, 97% or greater, 98% or greater, or 99% greater as measured after heating the aerogel composite for 60 minutes.

In the aerogel composite of the present disclosure, the moisture impregnation rate (wt %) represented by Equation 4 below may be 5 wt % or less, preferably 2 wt % or less.

$$\text{Moisture impregnation rate (wt \%)} = \{(\text{Weight of specimen after impregnation} - \text{Weight of specimen before impregnation})/ (\text{Weight of specimen before impregnation})\} \times 100 \quad \text{[Equation 4]}$$

In Equation 4 above, the moisture impregnation rate may be calculated by floating a specimen of 100 mm×100 mm in size of the aerogel composite on distilled water at 21±2° C., and then placing a 6.4 mm mesh screen on top of the specimen to impregnate the specimen by sinking the same to 127 mm below the surface of the water, and after 15 minutes, removing the mesh screen and when the specimen rises to the surface, picking the specimen up with a clamp and hanging the specimen vertically for 60±5 seconds, and then measuring the weight retention rate by measuring the weight before and after the impregnation, respectively. Here, the lower the moisture impregnation rate, the higher the degree of hydrophobicity of the aerogel composite.

In the present disclosure, the average heat for sustained burning (Qsb; MJ/m$^2$) of the aerogel composite may be 0.5 MJ/m$^2$ or greater, preferably 0.7 MJ/m$^2$ or greater. Here, the average heat for sustained burning may be measured in accordance with the ISO 5658-2 standard.

In the present disclosure, the critical flux at extinguishment (CHF; kW/m$^2$) of the aerogel composite may be 25 kW/m$^2$ or greater, preferably 30 MJ/m$^2$ or greater. Here, the critical flux at extinguishment may be measured in accordance with the ISO 5658-2 standard.

In the present disclosure, the aerogel composite may have a thermal conductivity at room temperature (23±5° C.) of 30.0 mW/mK or less, 25.0 mW/mK or less, or 20.0 mW/mK or less, preferably 15.0 mW/mK or less, and when in this range, there is an effect of securing the heat insulation of the aerogel composite to the maximum.

In the present disclosure, the aerogel composite may have a thermal conductivity at a high temperature (150° C.) of 35.0 mW/mK or less, 30.0 mW/mK or less, or 25.0 mW/mK, and when in this range, there is an effect of securing the heat insulation of an aerogel composite to the maximum.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a specimen according to the ASTM C165 standard.

In the present disclosure, the aerogel composite has a tensile strength of 30 N/cm$^2$ to 60 N/cm$^2$, 40 N/cm$^2$ to 55 N/cm$^2$, or 45 N/cm$^2$ to 55 N/cm$^2$, and may have excellent flexibility. Here, the tensile strength may be measured by preparing a specimen according to the ASTM D638 standard.

In the present disclosure, the aerogel composite may be generally formed by preparing a silica sol, impregnating a fiber substrate with the silica sol, and then performing gelation thereon, and drying the same. Hereinafter, each step will be described. However, the specific preparation processes or examples thereof described herein are not intended to be limited to any particular type of aerogel or preparation method thereof. The present disclosure may include any aerogel formed by any associated preparation method known to those skilled in the art.

Preparation of Silica Sol

In the present disclosure, a silica precursor composition may be used to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica precursor composition may further include silicate including a hydrophobic group. In the present disclosure, the type of the silicate including a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES), but are not limited thereto.

In the present disclosure, when preparing a silica precursor composition, a silicate containing ammonium ions ($NH_4^+$) in an amount of 0.1 wt % to 2 wt %, 0.4 wt % to 1.5 wt %, or 0.4 wt % to 1 wt % may be further added to allow ammonium bicarbonate ($NH_4HCO_3$) or ammonium carbonate (($NH_4)_2CO_3$) particles to be included in the above-described content on an aerogel composite to be manufactured or in pores inside an aerogel, or to allow ammonia gas to be generated in an amount of the above-mentioned range per unit weight of the aerogel composite when the aerogel composite is heated at a temperature of 150° C. for 60 minutes, and as an example, trimethylethoxysilane (TMES) containing ammonium ions ($NH_4^+$) in an amount of 0.1 wt % to 2 wt %, 0.4 wt % to 1.5 wt %, or 0.4 wt % to 1 wt % may be used.

In the present disclosure, trimethylethoxysilane (TMES) containing ammonium ions ($NH_4^+$) in the above content range may be prepared by heating and refluxing hexamethyldisilazane (HMDS) in the presence of an organic solvent and an acid catalyst. Conditions of the reflux are not particularly limited, and may be included without limitation as long as the reflux is performed such that the content of ammonium ions ($NH_4^+$) is within the above range, and for example, the reflux may be performed at 100° C. to 140° C., 100° C. to 130° C., or 100° C. to 120° C. for 10 minutes to 6 hours, 20 minutes to 6 hours, 30 minutes to 6 hours, 30 minutes to 5 hours, or 30 minutes to 4 hours.

In the present disclosure, when the silicate including a hydrophobic group is included in the silica precursor composition, the silicate including a hydrophobic group and the tetraalkyl silicate may be included in a molar ratio (molar ratio of silicate including a hydrophobic group:tetraalkyl silicate) of 9:1 to 1:9. Within the above range, the strength and heat insulation performance of an aerogel may be secured with high efficiency, and contraction may be prevented during atmospheric pressure drying, thereby preventing degradation in heat insulation performance.

In the present disclosure, the silica concentration of the silica precursor composition may be 10 kg/m$^3$ to 100 kg/m$^3$, 20 kg/m$^3$ to 80 kg/m$^3$, 30 kg/m$^3$ to 70 kg/m$^3$, 30 kg/m$^3$ to 60 kg/m$^3$, or 35 kg/m$^3$ to 45 kg/m$^3$, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol becomes 0.1 wt % to 30 wt %, but is not limited thereto. When the content of the silica satisfies the above range, it is preferable in terms of securing mechanical physical properties, the flexibility in particular, of the aerogel composite at an excellent level while having the effect of improving heat insulation.

In the present disclosure, the polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. In the present disclosure, when considering the miscibility with water and an aerogel, the polar organic solvent may be a monohydric alcohol having 1 to 6 carbon atoms such as methanol, ethanol, isopropanol, and butanol, and may be, for example, ethanol.

In the present disclosure, the polar organic solvent may be used in an appropriate amount by those skilled in the art in consideration of the degree of hydrophobicity in an aerogel composite to be finally produced while promoting a surface modification reaction.

In the present disclosure, in order to prepare a pre-hydrolyzed silica precursor when preparing the silica precursor composition, the silica precursor and an organic solvent may be mixed and prepared at a weight ratio of 1:0.1 to 1.5, 1:0.5 to 1.5, or 1:0.5 to 1.2, but are not limited thereto.

In addition, in the present disclosure, in order to prepare a pre-hydrolyzed silica precursor when preparing the silica precursor composition, the silica precursor and water may be mixed and prepared at a molar ratio of 1:0.1 to 10, 1:1 to 8, or 1:2 to 6, but are not limited thereto.

In addition, in the present disclosure, when a pre-hydrolyzed silica precursor (e.g., HTEOS) is included as a silica precursor when preparing the silica precursor composition, in order to satisfy the silica concentration, the pre-hydrolyzed silica precursor (e.g., HTEOS) and an organic solvent may be mixed at a weight ratio of 1:2 to 10, 1:3 to 8, or 1:3 to 6, but are not limited thereto.

In the present disclosure, the silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and as an example, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide (Ca(OH)$_2$), ammonia (NH$_3$), ammonium hydroxide (NH$_4$OH; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

In the present disclosure, the base catalyst may be included in an amount which allows the pH of the sol to be 7 to 11. If the pH of the sol is out of the above range, gelation may not be easily achieved or a gelation rate may be too low, so that processability may be degraded. In addition, since the base may be precipitated when introduced in a solid phase, it may be preferable that the base is added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

In the present disclosure, if necessary, an additive may be further added to the silica sol. At this time, all known additives which may be added when preparing an aerogel may be applied as the additive, and for example, an additive such as an opacifying agent and an additional flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 1° C. to 40° C., 20° C. to 40° C., 25° C. to 40° C., 30° C. to 40° C., or 35° C. to 45° C. When the temperature of the silica sol in the reaction vessel satisfies the above range, it is preferable in that the above-described viscosity range of the catalyzed sol may be more easily achieved, and even the retention time is relatively short, a desired level of viscosity range may be achieved.

In the present disclosure, the catalyzed silica sol may be impregnated into the substrate at a volume ratio of 0.1 to 10:1 (catalyzed silica sol:substrate), a volume ratio of 0.1 to 1:1, a volume ratio of 0.3 to 1:1, a volume ratio of 0.5 to 1:1, or a volume ratio of 0.7 to 1:1, but is not limited thereto.

In the present disclosure, the silica sol impregnated into the substrate may be subjected to gelation simultaneously with the impregnation process of the silica sol or sequentially after the impregnation process.

In the present disclosure, the substrate impregnated with the catalyzed sol may be subjected to gelation on a moving element such as a conveyor belt.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, the gelation may be performed under an atmosphere temperature of 20° C. to 40° C., or 20° C. to 30° C., and the gelation time may be 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but is not limited thereto.

Aging of Wet Gel Composite, which has Gelled

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the wet gel composite, which has gelled, to stand as it is at an appropriate temperature, or may be performed by adding a cross-linking-promoting compound.

In addition, in the present disclosure, the aging step may be performed by adding a solution in which a base catalyst such as sodium hydroxide (NaOH), potassium hydroxide (KOH), ammonium hydroxide ($NH_4OH$), triethylamine, pyridine, or the like is diluted to a concentration of 1% to 10% in an organic solvent, in the presence of the wet gel composite. In this case, a Si—O—Si bonding in an aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In the present disclosure, the aging step may be performed by leaving the wet gel composite, which has gelled, to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, the aging step may be performed by performing primary aging of leaving the wet gel composite, which has gelled at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, in the presence of a solution in which the base catalyst is diluted to a concentration of 1% to 10% in an organic solvent.

In the present disclosure, the aging step may be performed in a separate reaction vessel after recovering the wet gel composite which has gelled, or may be performed inside the reaction vessel in which the gelation step has been performed.

Surface Modification of Aged Wet Gel Composite

The present disclosure includes a surface modification step of hydrophobizing the surface of the wet gel composite obtained by gelation as described above or the surface of the aged wet gel composite in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof, but in the present disclosure, it is preferable that a surface modifier is used to allow ammonium bicarbonate ($NH_4HCO_3$) or ammonium carbonate (($NH_4)_2CO_3$) particles to be included in the above-described content on an aerogel composite to be finally manufactured or in pores inside an aerogel, or to allow ammonium bicarbonate ($NH_4HCO_3$) or ammonium carbonate (($NH_4)_2CO_3$) to be included such that ammonia gas is generated in an amount of the above-mentioned range per unit weight of the aerogel composite when the aerogel composite is heated at a temperature of 150° C. for 60 minutes.

In general, when surface-modifying an aerogel, hexamethyldisillazane (HMDS) is commonly used as a surface modifier. However, when the surface of a silica aerogel is hydrophobized using hexamethyldisilazane (HMDS), ammonium ions ($NH_4^+$) are formed, which react with carbon dioxide in a supercritical drying stage and form an ammonium carbonate salt, and in this case, the amount of ammonium carbonate produced is not controlled, and also, the ammonium carbonate produced at this time blocks the piping of the supercritical drying equipment, so that there is a problem in that it is difficult to manufacture an aerogel composite. In order to solve the above problem, a method of lowering the pressure of an extract solution, thereby lowering the temperature of the extract solution during supercritical drying to precipitate and remove ammonium carbonate has been proposed, but in that case, the amount of ammonium carbonate remaining in an aerogel composite is extremely small, so that it is not possible to achieve the flame retardancy or thermal stability desired in the present disclosure.

Therefore, in the present disclosure, a surface modifier containing ammonium ions ($NH_4^+$) in an amount of 0.1 wt % to 2 wt %, 0.5 wt % to 1.5 wt %, or 0.5 wt % to 1 wt % may be used as the surface modifier, and as an example, trimethylethoxysilane (TMES) containing ammonium ions ($NH_4^+$) in an amount of 0.1 wt % to 2 wt %, 0.5 wt % to 1.5 wt %, or 0.5 wt % to 1 wt % may be used.

In the present disclosure, trimethylethoxysilane (TMES) containing ammonium ions ($NH_4^+$) in the above content range may be prepared by heating and refluxing hexamethyldisilazane (HMDS) in the presence of an organic solvent and an acid catalyst. Conditions of the reflux are not particularly limited, and may be included without limitation as long as the reflux is performed such that the content of ammonium ions ($NH_4^+$) is within the above range, and for example, the reflux may be performed at 100° C. to 140° C., 100° C. to 130° C., or 100° C. to 120° C. for 10 minutes to 6 hours, 20 minutes to 6 hours, 30 minutes to 6 hours, 30 minutes to 5 hours, or 30 minutes to 4 hours.

In the present disclosure, the surface modifier may be used in a solution phase diluted in an organic solvent. Here, the organic solvent may be an alcohol (an organic solvent), and at this time, the surface modifier may be diluted to 1 vol % to 15 vol %, 1 vol % to 10 vol %, or 1 vol % to 5 vol %, based on the total volume of the diluted solution.

In addition, in the present disclosure, the surface modifier may be added in an amount of 0.01 vol % to 95 vol %, 0.1 vol % to 90 vol %, 1 vol % to 90 vol %, 10 vol % to 90 vol %, 50 vol % to 90 vol %, or 70 vol % to 90 vol %, with respect to the wet gel composite for a sufficient surface modification effect, but is not limited thereto.

In the present disclosure, an ammonia solution may be additionally added in addition to a surface modifier containing ammonium ions ($NH_4^+$) in the above surface modification step so that ammonium bicarbonate ($NH_4HCO_3$) or ammonium carbonate (($NH_4)_2CO_3$) particles are contained in the above-mentioned amount on a finally produced aerogel composite or in pores in the aerogel, or an ammonia gas per unit weight of the aerogel composite is generated in an amount within the above-mentioned range when the aerogel composite is heated at a temperature of 150° C. for 60 minutes.

In the present disclosure, the surface modification step may be performed at a temperature of 50° C. to 90° C. or 50° C. to 80° C. for 1 hour to 24 hours, but is not limited thereto.

Drying Step

In the present disclosure, a drying step of drying the surface-modified wet gel composite to obtain an aerogel composite may be included.

In the present disclosure, the drying is performed as a process of removing only the solvent while maintaining the pore structure of the aged gel, and may be performed, for example, by supercritical drying or atmospheric pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby producing an aerogel composite, but the present disclosure is not limited thereto.

In the present disclosure, the pressure of an extract solution discharged from a supercritical extractor used during supercritical drying is lowered to a range of 45 bar to 50 bar, thereby lowering the temperature of the extract solution to a temperature of 30° C. or lower, so that a process of inducing the precipitation of ammonium carbonate or ammonium hydrochloride may not be included.

In addition, in the present disclosure, the atmospheric pressure drying process may be performed according to a typical method such as hot air drying or IR drying at a temperature of 70° C. to 200° C. and under an atmospheric pressure (1±0.3 atm), but is not limited thereto.

The aerogel composite provided in the present disclosure may be usefully used as a heat insulation material, thermal insulation material, or non-combustible material for aircraft, ships, automobiles, electronic devices, and batteries, as well as for plant facilities for heat and cold insulation, such as piping or industrial furnaces of various industrial facilities.

In accordance with some embodiments of the present disclosure, a heat insulation member includes the aerogel composite provided in the present disclosure.

In the present disclosure, the heat insulation member may include the aerogel composite as described above, and a support member positioned on at least one surface of an upper surface or a lower surface of the aerogel composite.

In the present disclosure, the support member may be, for example, a film-like support member, a sheet-like support member, a foil-like support member, a porous support member, and the like.

In the present disclosure, the film-like support member is formed by molding a polymer raw material into a thin film, and examples thereof may include an organic film of such as PET and polyimide, a glass film, and the like (including a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, and the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

In the present disclosure, the thickness of the support member is not particularly limited, and may be, for example, 0.1 m to 100 m, or 1 m to 50 m.

In the present disclosure, the heat insulation member may also be applied to applications such as a heat insulation material, thermal insulation material, or non-combustible material in the construction field, aviation field, automobile field, batteries, home appliances, semiconductor field, industrial facilities, and the like.

Hereinafter, the present disclosure will be described in detail with reference to the following examples. However, the following examples are illustrative of the present disclosure, and the contents of the present disclosure are not limited by the following Examples.

EXAMPLES

Example 1

1.30 mol of ethanol and 0.02 g of a HCl acid catalyst were added and mixed, and then 0.62 mol of HMDS was added thereto and mixed. Thereafter, the mixture was subject to reflux at 100° C. for 1 hour, and the generation of ammonia ($NH_3$) gas was confirmed. Through the above process, TMES containing 0.85 wt % of ammonium ions($NH_4^+$) was prepared. The obtained TMES and TEOS were mixed in a molar ratio of 1:9 to prepare a silica precursor composition. The silica precursor composition and water were mixed in a molar ratio of 1:4, and ethanol having a weight ratio of 1:1 with the silica precursor composition was added thereto to prepare a hydrated precursor solution. In order to facilitate hydrolysis, hydrochloric acid was added to allow the pH of the silica sol to be 3 or less. Ethanol having a weight ratio of 1:3 with the hydrated precursor solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 2 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 10 minutes while moving on a conveyor belt at a predetermined rate. At this time, the ambient atmosphere temperature at the top of the conveyor belt was maintained at 25° C. 90 vol % of the TMES/ethanol solution (volume ratio of 5:95) obtained above was added as a surface modification to the wet gel composite based on the volume of the wet gel composite, and then surface-modification was performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Example 2

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 3 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 10 minutes while moving on a conveyor belt at a predetermined rate. At this time, the ambient atmosphere temperature at the top of the conveyor belt was maintained at 25° C. For surface modification, 1.30 mol of ethanol and 0.02 g of a HCl acid catalyst were added and mixed, and then 0.62 mol of HMDS was added thereto and mixed. Thereafter, TMES containing 0.41 wt % of ammonium ions ($NH_4^+$) was prepared by reflux at 110° C. for 6 hours. 90 vol % of the TMES/ethanol solution (volume ratio of 5:95) obtained above as a surface modifier was added to the wet gel composite based on the volume of the wet gel composite, and then ammonia water was added thereto to add 600 ppm of $NH_4^+$ ions with respect to the weight of the TMES. The surface modification was then performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Example 3

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 10 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 10 minutes while moving on a conveyor belt at a predetermined rate. At this time, the ambient atmosphere temperature at the top of the conveyor belt was maintained at 25° C. For surface modification, 1.30 mol of ethanol and 0.02 g of a HCl acid catalyst were added and mixed, and then 0.62 mol of HMDS was added thereto and mixed. Thereafter, TMES containing 0.97 wt % of ammonium ions ($NH_4^+$) was prepared by reflux at 120° C. for 30 minutes. 90 vol % of the TMES/ethanol solution (volume ratio of 5:95) obtained above was added as a surface modification to the wet gel composite based on the volume of the wet gel composite, and then surface-modification was performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Example 4

1.30 mol of ethanol and 0.02 g of a HCl acid catalyst were added and mixed, and then 0.62 mol of HMDS was added thereto and mixed. Thereafter, TMES containing 0.51 wt % of ammonium ions ($NH_4^+$) was prepared by reflux at 100° C. for 4 hours. The obtained TMES and TEOS were mixed in a molar ratio of 1:9 to prepare a silica precursor composition. The silica precursor composition and water were mixed in a molar ratio of 1:4, and ethanol having a weight ratio of 1:1 with the silica precursor composition was added thereto to prepare a hydrated precursor solution. In order to facilitate hydrolysis, hydrochloric acid was added to allow the pH of the silica sol to be 3 or less. Ethanol having a weight ratio of 1:3 with the hydrated precursor solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 3 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 20 minutes while moving on a conveyor belt at a predetermined rate. At this time, the ambient atmosphere temperature at the top of the conveyor belt was maintained at 25° C. 90 vol % of the TMES/ethanol solution (volume ratio of 5:95) obtained above was added as a surface modification to the wet gel composite based on the volume of the wet gel composite, and then surface-modification was performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Example 5

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 10 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 10 minutes while moving on a conveyor belt at a predetermined rate. At this time, the ambient atmosphere temperature at the top of the conveyor belt was maintained at 25° C. For surface modification, 1.30 mol of ethanol and 0.02 g of a HCl acid catalyst were added and mixed, and then 0.62 mol of HMDS was added thereto and mixed. Thereafter, TMES containing 0.62 wt % of ammonium ions ($NH_4^+$) was prepared by reflux at 100° C. for 3 hours. 90 vol % of the TMES/ethanol solution (volume ratio of 5:95) obtained above was added as a surface modification to the wet gel composite based on the volume of the wet gel composite, and then surface-modification was performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Comparative Example 1

TMES which does not contain ammonium ions ($NH_4^+$), and TEOS were mixed at a molar ratio of 1:9 to prepare a silica precursor composition. The silica precursor composition and water were mixed in a molar ratio of 1:4, and ethanol having a weight ratio of 1:1 with the silica precursor composition was added thereto to prepare a hydrated precursor solution. In order to facilitate hydrolysis, hydrochloric acid was added to allow the pH of the silica sol to be 3 or less. Ethanol having a weight ratio of 1:3 with the hydrated precursor solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 3 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 20 minutes while moving on a conveyor belt at a predetermined rate. At this time, the ambient atmosphere temperature at the top of the conveyor belt was maintained at 25° C. 90 vol % of a TMES/ethanol solution (volume ratio of 5:95) not containing ammonium ions ($NH_4^+$) was added as a surface modification to the wet gel composite based on the volume of the wet gel composite, and then surface-modification was performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Comparative Example 2

TMES which does not contain ammonium ions ($NH_4^+$), and TEOS were mixed at a molar ratio of 1:9 to prepare a silica precursor composition. The silica precursor composition and water were mixed in a molar ratio of 1:3, and ethanol having a weight ratio of 1:1 with the silica precursor composition was added thereto to prepare a hydrated precursor solution. In order to facilitate hydrolysis, hydrochloric acid was added to allow the pH of the silica sol to be 3 or less. Ethanol having a weight ratio of 1:2.5 with the hydrated precursor solution was added to prepare a silica sol. A base catalyst solution (20 wt % of ammonium carbonate aqueous solution) having a volume ratio of 90:10 with the silica sol was added to prepare a catalyzed silica sol. After filling 33.3 L of the catalyzed silica sol in an impregnation tank, a fiber (a glass fiber fiber mat, 10 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 20 minutes while moving on a conveyor belt at a predetermined rate. At this time, the ambient atmosphere temperature at the top of the conveyor belt was maintained at 25° C. 90 vol % of a HMDS/ethanol solution (volume ratio of 1:19) was added as a surface modification to the wet gel composite based on the volume of the wet gel composite, and then surface-modification was performed at a temperature of 70° C. for 2 hours. After the surface modification was completed, the prepared silica gel-fiber composite was placed into a 70 L supercritical extractor and $CO_2$ was continuously injected thereto at 80° C. and 160 bar at a rate of 6.5 L/min. Thereafter, after extraction was performed for 20 minutes, $CO_2$ was continuously injected again at 80° C. and 160 bar at a rate of 6.5 L/min for another 20 minutes, and the discharged extract solution was delivered to a pressure control valve connected to the supercritical extractor, and the pressure was lowered to 50 bar using the pressure control valve. The above continuous injection, extraction, continuous injection, and discharge processes were repeated several times (4 times). The temperature of the extract solution was lowered to about 25° C. to about 30° C., and thus, precipitates ammonium carbonate and ammonium bicarbonate, which were removed through a 100-mesh filter connected to the pressure control valve.

Comparative Example 3

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed silica sol in an impregnation tank, a fiber (a glass fiber fiber mat, 2 mm) as a substrate was passed therethrough to infiltrate the silica sol into the fiber, wherein the silica sol was impregnated into the fiber mat at a volume ratio of 1:1 (silica sol:fiber). The fiber which passed through the impregnation tank to allow the silica sol to infiltrate thereinto was gelled for 10 minutes while moving on a conveyor belt at a predetermined rate. At this time, the ambient atmosphere temperature at the top of the conveyor belt was maintained at 25° C. For surface modification, 1.30 mol of ethanol and 0.02 g of a HCl acid catalyst were added and mixed, and then 0.62 mol of HMDS was added thereto and mixed. Thereafter, TMES containing 4.57 wt % of ammonium ions ($NH_4^+$) was prepared by reflux at 90° C. for 30 minutes. 90 vol % of the TMES/ethanol solution (volume ratio of 5:95) obtained above was added as a surface modification to the wet gel composite based on the volume of the wet gel composite, and then surface-modification was performed at a temperature of 75° C. for 4 hours. After the surface modification was completed, the silica gel wet gel composite was placed into a 70 L supercritical extractor and $CO_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over 20 minutes. Thereafter, $CO_2$ was vented over the course of 2 hours to produce a silica aerogel composite.

Experimental Example 1

In order to evaluate the content of ammonium carbonate or ammonium bicarbonate contained in an aerogel composite manufactured according to the present disclosure, using the fact that ammonium carbonate and ammonium bicarbonate are pyrolyzed into carbon dioxide and water vapor when heated, an aerogel composite specimen was heated at 150° C. to measure the amount of ammonia generated. Specifically, from each aerogel composite of Examples and Comparative Examples, five square specimens having a size of 1 cm×1 cm were obtained. More specifically, four specimens were obtained by positioning a position, which is spaced apart by 10 cm in a center direction from each corner of an aerogel composite having a size of 12 cm×60 cm, at the exact center of a specimen, and one specimen was obtained by positioning the exact central portion of the aerogel composite at the exact center of a specimen. For quantitative testing, 5 L of an ammonia aqueous solution having a concentration of 0.28% was taken, and placed and sealed in a 20 mL headspace vial, and then heated to a temperature of 150° C. for 1 hour, followed by performing Headspace-GC/NCD analysis. Using the area value of a peak obtained at this time, a one-point calibration curve was obtained. The specimen was then placed and sealed in a 20 ml headspace vial, and the Headspace-GC/NCD analysis was performed in the same way. The area of a peak obtained at this time was substituted into the calibration curve to obtain the content of ammonia generated in the specimen. An average value of the amount of ammonia generation (g/g) per unit weight of the specimen measured in the five specimens is shown in Table 1 below. Based on the amount of ammonia generation measured in this way, a converted value of the content (ppm) of ammonium bicarbonate ($NH_4HCO_3$) or ammonium carbonate (($NH_4)_2CO_3$) present in the aerogel composite is shown in Table 1 below.

TABLE 1

| Classifications | Weight of specimen (g) | NH₃ generation amount (μg/g) | (NH₄)₂CO₃ content (ppm) | NH₄HCO₃ content (ppm) |
|---|---|---|---|---|
| Example 1 | 0.03 to 0.04 | 31 | 175 | 144 |
| Example 2 | 0.06 to 0.07 | 18 | 102 | 84 |
| Example 3 | 0.31 to 0.35 | 38 | 214 | 176 |
| Example 4 | 0.09 to 0.11 | 12 | 68 | 56 |
| Example 5 | 0.15 to 0.19 | 16 | 90 | 76 |
| Comparative Example 1 | 0.10 to 0.11 | 5 | 28 | 23 |
| Comparative Example 2 | 0.18 to 0.30 | 4 | 23 | 19 |
| Comparative Example 3 | 0.04 to 0.06 | 91 | 513 | 422 |

As shown in Table 1, the aerogel composite (Examples 1 to 5) according to the present disclosure generated ammonia gas in an amount of approximately 10 μg/g to 50 μg/g when heated at 150° C. for 1 hour. However, the aerogel composite of Comparative Examples 1 and 2 released a very small amount of ammonia gas, which was respectively 5 μg/g and 4 μg/g, when heated, and the aerogel composite of Comparative Example 3 was released a very large amount of ammonia gas, which was 91 μg/g.

From the results, it can be seen that the aerogel composite according to the present disclosure contains a greater amount of ammonium carbonate or ammonium bicarbonate compared to that of Comparative Examples 1 and 2, and contains a smaller amount thereof than that of Comparative Example 3.

Experimental Example 2

In order to evaluate the thermal stability at a high temperature of 300° C. of an aerogel composite manufactured according to the present disclosure, the aerogel composite manufactured in each of Examples and Comparative Examples was maintained at an isothermal temperature of 300° C. for 1 hour to analyze the weight retention rate of the aerogel composite over time. For this analysis, five square specimens having a size of 1 cm×1 cm were obtained from aerogel composites produced from each embodiment and comparative example in the same manner as in Experimental Example 1. Here, a pre-heat treatment was performed on each analysis specimen at a temperature of 150° C. for one hour in order to avoid an influence of moisture due to a storage environment of each analysis specimen. Thereafter, the specimens were further cut into a size suitable for Mettler toledo TGA2 analysis equipment and put into a crucible of the Mettler toledo TGA2 analysis equipment, and temperature was increased to 300° C. at a temperature increase rate of 100° C./min, and thereafter, at the temperature of 300° C. for one hour, a weight reduction rate compared to an initial stage (150° C., after heat treatment for one hour) was measured. The values obtained by averaging results of a weight retention rate and weight loss rate measured over time for each of five specimens are shown in Table 2 below.

In addition, in order to confirm the degree of variation of weight loss over time, the average value (b) of weight retention rates measured at 5 minutes, 10 minutes, 15 minutes, 20 minutes, 25 minutes, and 30 minutes was calculated, and the difference between the weight retention rate (a) and the average value at each time, and the percentage (A) of the difference compared to the average value (b) was calculated and are shown in Table 3 below. However, in Table 3 below, the average value (b) and the deviation percentage (A) of the weight retention rates are rounded from five decimal places and expressed as four decimal places.

Equation 2

A={(Weight retention rate measured after heating for x time (a))−(Average value of weight retention rates after heating (b))}/(Average value of weight retention rates after heating (b))×100

TABLE 2

| | | (wt %) | |
|---|---|---|---|
| | Duration | Weight retention rate | Weight loss rate |
| Example 1 | 5 minutes(300 seconds) | 99.4724 | 0.5276 |
| | 10 minutes(600 seconds) | 99.397 | 0.603 |
| | 15 minutes(900 seconds) | 99.3782 | 0.6218 |
| | 20 minutes(1200 seconds) | 99.3593 | 0.6407 |
| | 25 minutes(1500 seconds) | 99.3405 | 0.6595 |
| | 30 minutes(1800 seconds) | 99.3405 | 0.6595 |
| | 40 minutes(2400 seconds) | 99.3028 | 0.6972 |
| | 50 minutes(3000 seconds) | 99.3028 | 0.6972 |
| | 60 minutes(3600 seconds) | 99.3028 | 0.6972 |
| Example 2 | 5 minutes(300 seconds) | 98.3356 | 1.6644 |
| | 10 minutes(600 seconds) | 98.2024 | 1.7976 |
| | 15 minutes(900 seconds) | 98.1525 | 1.8475 |
| | 20 minutes(1200 seconds) | 98.1192 | 1.8808 |
| | 25 minutes(1500 seconds) | 98.1025 | 1.8975 |
| | 30 minutes(1800 seconds) | 98.0859 | 1.9141 |
| | 40 minutes(2400 seconds) | 98.0526 | 1.9474 |
| | 50 minutes(3000 seconds) | 98.0359 | 1.9641 |
| | 60 minutes(3600 seconds) | 98.0193 | 1.9807 |
| Example 3 | 5 minutes(300 seconds) | 97.5504 | 2.4496 |
| | 10 minutes(600 seconds) | 97.3689 | 2.6311 |
| | 15 minutes(900 seconds) | 97.3145 | 2.6855 |
| | 20 minutes(1200 seconds) | 97.26 | 2.74 |
| | 25 minutes(1500 seconds) | 97.2237 | 2.7763 |
| | 30 minutes(1800 seconds) | 97.2056 | 2.7944 |
| | 40 minutes(2400 seconds) | 97.1512 | 2.8488 |
| | 50 minutes(3000 seconds) | 97.133 | 2.867 |
| | 60 minutes(3600 seconds) | 97.0967 | 2.9033 |
| Example 4 | 5 minutes(300 seconds) | 99.3587 | 0.6413 |
| | 10 minutes(600 seconds) | 99.2186 | 0.7814 |
| | 15 minutes(900 seconds) | 99.1449 | 0.8551 |
| | 20 minutes(1200 seconds) | 99.086 | 0.914 |
| | 25 minutes(1500 seconds) | 99.0417 | 0.9583 |
| | 30 minutes(1800 seconds) | 98.9975 | 1.0025 |
| | 40 minutes(2400 seconds) | 98.9238 | 1.0762 |
| | 50 minutes(3000 seconds) | 98.8722 | 1.1278 |
| | 60 minutes(3600 seconds) | 98.8132 | 1.1868 |
| Example 5 | 5 minutes(300 seconds) | 98.1754 | 1.8246 |
| | 10 minutes(600 seconds) | 98.0864 | 1.9136 |
| | 15 minutes(900 seconds) | 97.9998 | 2.0002 |
| | 20 minutes(1200 seconds) | 97.9921 | 2.0079 |
| | 25 minutes(1500 seconds) | 97.9815 | 2.0185 |
| | 30 minutes(1800 seconds) | 97.9687 | 2.0313 |
| | 40 minutes(2400 seconds) | 97.9471 | 2.0529 |
| | 50 minutes(3000 seconds) | 97.9233 | 2.0767 |
| | 60 minutes(3600 seconds) | 97.9025 | 2.0975 |
| Comparative Example 1 | 5 minutes(300 seconds) | 99.1711 | 0.8289 |
| | 10 minutes(600 seconds) | 98.728 | 1.272 |
| | 15 minutes(900 seconds) | 98.3057 | 1.6943 |
| | 20 minutes(1200 seconds) | 97.9321 | 2.0679 |
| | 25 minutes(1500 seconds) | 97.605 | 2.395 |
| | 30 minutes(1800 seconds) | 97.3213 | 2.6787 |
| | 40 minutes(2400 seconds) | 96.8886 | 3.1114 |
| | 50 minutes(3000 seconds) | 96.4793 | 3.5207 |
| | 60 minutes(3600 seconds) | 96.1276 | 3.8724 |
| Comparative Example 2 | 5 minutes(300 seconds) | 99.1727 | 0.8273 |
| | 10 minutes(600 seconds) | 98.482 | 1.518 |
| | 15 minutes(900 seconds) | 97.9921 | 2.0079 |
| | 20 minutes(1200 seconds) | 97.5905 | 2.4095 |
| | 25 minutes(1500 seconds) | 97.2452 | 2.7548 |
| | 30 minutes(1800 seconds) | 96.9239 | 3.0761 |

TABLE 2-continued

| | | (wt %) | |
|---|---|---|---|
| | Duration | Weight retention rate | Weight loss rate |
| | 40 minutes(2400 seconds) | 96.3778 | 3.6222 |
| | 50 minutes(3000 seconds) | 95.9039 | 4.0961 |
| | 60 minutes(3600 seconds) | 95.4783 | 4.5217 |
| Comparative Example 3 | 5 minutes(300 seconds) | 99.7864 | 0.2136 |
| | 10 minutes(600 seconds) | 98.6024 | 1.3976 |
| | 15 minutes(900 seconds) | 97.3546 | 2.6454 |
| | 20 minutes(1200 seconds) | 97.1549 | 2.8451 |
| | 25 minutes(1500 seconds) | 96.9154 | 3.0846 |
| | 30 minutes(1800 seconds) | 96.7164 | 3.2836 |
| | 40 minutes(2400 seconds) | 96.315 | 3.685 |
| | 50 minutes(3000 seconds) | 96.0198 | 3.9802 |
| | 60 minutes(3600 seconds) | 95.8761 | 4.1239 |

TABLE 3

| | | (wt %) | | |
|---|---|---|---|---|
| | Duration | Weight retention rate(a) | Average value(b) | Deviation percentage(A) |
| Example 1 | 5 minutes(300 seconds) | 99.4724 | 99.3813 | 0.0917 |
| | 10 minutes(600 seconds) | 99.397 | | 0.0158 |
| | 15 minutes(900 seconds) | 99.3782 | | −0.0031 |
| | 20 minutes(1200 seconds) | 99.3593 | | −0.0221 |
| | 25 minutes(1500 seconds) | 99.3405 | | −0.0411 |
| | 30 minutes(1800 seconds) | 99.3405 | | −0.0411 |
| Example 2 | 5 minutes(300 seconds) | 98.3356 | 98.1664 | 0.1724 |
| | 10 minutes(600 seconds) | 98.2024 | | 0.0367 |
| | 15 minutes(900 seconds) | 98.1525 | | −0.0141 |
| | 20 minutes(1200 seconds) | 98.1192 | | −0.0480 |
| | 25 minutes(1500 seconds) | 98.1025 | | −0.0650 |
| | 30 minutes(1800 seconds) | 98.0859 | | −0.0820 |
| Example 3 | 5 minutes(300 seconds) | 97.5504 | 97.3205 | 0.2362 |
| | 10 minutes(600 seconds) | 97.3689 | | 0.0497 |
| | 15 minutes(900 seconds) | 97.3145 | | −0.0062 |
| | 20 minutes(1200 seconds) | 97.26 | | −0.0622 |
| | 25 minutes(1500 seconds) | 97.2237 | | −0.0995 |
| | 30 minutes(1800 seconds) | 97.2056 | | −0.1181 |
| Example 4 | 5 minutes(300 seconds) | 99.3587 | 99.1412 | 0.2194 |
| | 10 minutes(600 seconds) | 99.2186 | | 0.0781 |
| | 15 minutes(900 seconds) | 99.1449 | | 0.0037 |
| | 20 minutes(1200 seconds) | 99.086 | | −0.0557 |
| | 25 minutes(1500 seconds) | 99.0417 | | −0.1004 |
| | 30 minutes(1800 seconds) | 98.9975 | | −0.1449 |
| Example 5 | 5 minutes(300 seconds) | 98.1754 | 98.0340 | 0.1443 |
| | 10 minutes(600 seconds) | 98.0864 | | 0.0535 |
| | 15 minutes(900 seconds) | 97.9998 | | −0.0349 |
| | 20 minutes(1200 seconds) | 97.9921 | | −0.0427 |
| | 25 minutes(1500 seconds) | 97.9815 | | −0.0535 |
| | 30 minutes(1800 seconds) | 97.9687 | | −0.0666 |
| Comparative Example 1 | 5 minutes(300 seconds) | 99.1711 | 98.1772 | 1.0124 |
| | 10 minutes(600 seconds) | 98.728 | | 0.5610 |
| | 15 minutes(900 seconds) | 98.3057 | | 0.1309 |
| | 20 minutes(1200 seconds) | 97.9321 | | −0.2497 |
| | 25 minutes(1500 seconds) | 97.605 | | −0.5828 |
| | 30 minutes(1800 seconds) | 97.3213 | | −0.8718 |
| Comparative Example 2 | 5 minutes(300 seconds) | 99.1727 | 97.9011 | 1.2989 |
| | 10 minutes(600 seconds) | 98.482 | | 0.5934 |
| | 15 minutes(900 seconds) | 97.9921 | | 0.0930 |
| | 20 minutes(1200 seconds) | 97.5905 | | −0.3172 |
| | 25 minutes(1500 seconds) | 97.2452 | | −0.6699 |
| | 30 minutes(1800 seconds) | 96.9239 | | −0.9981 |
| Comparative Example 3 | 5 minutes(300 seconds) | 99.7864 | 97.7550 | 2.0780 |
| | 10 minutes(600 seconds) | 98.6024 | | 0.8668 |
| | 15 minutes(900 seconds) | 97.3546 | | −0.4096 |
| | 20 minutes(1200 seconds) | 97.1549 | | −0.6139 |
| | 25 minutes(1500 seconds) | 96.9154 | | −0.8589 |
| | 30 minutes(1800 seconds) | 96.7164 | | −1.0625 |

As shown in Tables 2 and 3 above, the aerogel composites (Examples 1 to 5) according to the present disclosure had a small weight loss rate of the specimen after 5 minutes at a high temperature of 300° C., and had little weight change over time, and the weight retention rate was more than 97 wt %, and the weight loss rate was only less than 3 wt % even after a long period of time of 60 minutes. However, the aerogel composites of Comparative Examples 1 to 3 showed a pattern in that the weight of each of the aerogel composites continuously decreased for 60 minutes during the analysis, and the weight loss rate was significantly greater than that of Examples.

Experimental Example 4

In order to evaluate the moisture impregnation of the aerogel composite manufactured according to the present disclosure, a specimen of 10 cm×10 cm in size was prepared with the aerogel composite manufactured in each of Examples and Comparative Examples, and the specimen was floated on distilled water at 21±2° C., and then a 6.4 mm mesh screen was placed on top of the specimen to be sunk to 127 mm below the surface of the water (impregnation). 15 minutes later, the mesh screen was removed, and when the specimen rose to the surface, the specimen was picked up with a clamp and was hung vertically for 60±5 seconds. Thereafter, the weights of the specimen before/after the impregnation were respectively measured to measure the moisture impregnation rate according to Equation 4 below. The results are shown in Table 4 below.

Equation 4

Moisture impregnation rate (wt %)={(Weight of specimen after impregnation−Weight of specimen before impregnation)/(Weight of specimen before impregnation)}×100

TABLE 4

| Classifications | Moisture impregnation rate (wt %) |
|---|---|
| Example 1 | 0.8 |
| Example 2 | 1.2 |
| Example 3 | 1.5 |
| Example 4 | 1.3 |
| Example 5 | 1.1 |
| Comparative Example 1 | 1.2 |
| Comparative Example 2 | 1.5 |
| Comparative Example 3 | 9.1 |

As shown in Table 4 above, it can be seen that the aerogel composites (Examples 1 to 5) according to the present disclosure have a very low moisture impregnation rate of 2 wt % or less and high water repellency.

On the other hand, it can be seen that the aerogel composite of Comparative Example 3 has a very high moisture impregnation rate of 9.1 wt % and very low water repellency.

Experimental Example 5

In order to evaluate the flame retardancy of the aerogel composites manufactured according to the present disclosure, the aerogel composites of Examples 3 and 5 and the aerogel composite of Comparative Example 2 were manufactured having a size of 155 mm×800 mm×10 mm (length X width X thickness), and the average heat for sustained burning (Qsb) and the critical flux at extinguishment (CHF) were measured in accordance with the ISO 5658-2 standard, and the results are shown in Table 5 below. At this time, the average heat for sustained burning (QSB) is a value obtained by multiplying a fixed amount of heat for each 50 mm section by a period of time during which flame propagates, wherein the greater the average heat for sustained burning, the slower the flame propagation rate on the surface of the specimen, and the critical flux at extinguishment (CHF) is a factor related to the flame propagation distance on the surface of the specimen, wherein the larger the critical flux at extinguishment, the shorter the flame propagation distance on the surface of the specimen.

TABLE 5

| Classifications | Average heat for sustained burning (MJ/m$^2$) | Critical flux at extinguishment (kW/m$^2$) |
|---|---|---|
| Example 3 | 1.06 | 37.3 |
| Example 5 | 0.92 | 36.6 |
| Comparative Example 2 | 0.32 | 20.2 |

As shown in Table 5 above, the aerogel composites (Examples 3 and 5) according to the present disclosure have higher average heat for sustained burning (Qsb) and the critical flux at extinguishment (CHF) than those of the aerogel composite of Comparative Example 2, so that it can be seen that the flame retardancy is very excellent.

Although not shown in Table 5 above, the aerogel composites of Examples 1, 2 and 4 according to the present disclosure also have an average heat for sustained burning (Qsb) of 0.8 MJ/m$^2$ or greater, and a critical flux at extinguishment (CHF) of 30 kW/m$^2$ or greater, and thus, can be confirmed to have very excellent flame retardancy.

Experimental Example 6

In order to evaluate the high-temperature thermal conductivity of an aerogel composite manufactured according to the present disclosure, the high-temperature thermal conductivity of the aerogel composite manufactured in each of Examples and Comparative Examples was measured at a temperature of approximately 150° C. using NETZSCH's GHP 456 equipment, and the results are shown in Table 6 below.

TABLE 6

| Classifications | Thermal conductivity (mW/mK) |
|---|---|
| Example 1 | 18.5 |
| Example 2 | 19.7 |
| Example 3 | 20.0 |
| Example 4 | 18.0 |
| Example 5 | 19.1 |
| Comparative Example 1 | 25.7 |
| Comparative Example 2 | 25.9 |
| Comparative Example 3 | 30.1 |

As shown in Table 6 above, it can be seen that the aerogel composites (Examples 1 to 5) according to the present disclosure have lower high-temperature thermal conductivity than the aerogel composites of Comparative Examples 1 to 3, and particularly, it can be confirmed that the difference in thermal conductivity is large compared to that Comparative Example 3. From the results, it can be seen that the aerogel composite according to the present disclosure has excellent high-temperature heat insulation.

From the results, it can be confirmed that the aerogel composite of the present disclosure has high hydrophobicity, and has excellent flame retardancy and thermal stability by containing ammonium carbonate or ammonium bicarbonate to allow ammonia gas to be generated in the above amount in a high temperature environment, and maintains excellent heat insulation performance even in a high temperature environment.

An aerogel composite provided in the present disclosure has excellent thermal stability even when exposed to high temperatures for a long period of time since the degree of decomposition or loss of aerogel components is not large, and the amount of change in weight over time at high temperatures is small.

In addition, excellent flame retardancy may be achieved even though a flame retardant is not separately added when producing the aerogel composite provided in the present disclosure.

Thus, the aerogel composite according to the present disclosure may maintain an excellent level of thermal insulation even in a high-temperature environment.

A specific part of the present disclosure has been described in detail, and it is apparent to those skilled in the art that such specific description is merely a preferred embodiment, and that the scope of the present disclosure is not limited thereto. Therefore, the substantial scope of the present disclosure is defined by the appended claims and equivalents thereof.

What is claimed is:

1. An aerogel composite comprising a fiber substrate; and an aerogel including one or more pores,
    wherein:
    a weight retention rate measured after heating the aerogel composite at a temperature of 300° C. for 5 minutes, 10 minutes, 15 minutes, 20 minutes, 25 minutes, and 30 minutes satisfies Equation 2 below; and
    a weight retention rate measured after heating the aerogel composite at a temperature of 300° C. for 60 minutes is 97 wt % or greater:

$$A(\%) = \{(\text{Weight retention rate measured after heating for } x \text{ time}(a)) - (\text{Average value of weight retention rates after heating } (b))\} / (\text{Average value of weight retention rates after heating } (b)) \times 100 \quad [\text{Equation 2}]$$

wherein in Equation 2 above:
the x time is 5 minutes, 10 minutes, 15 minutes, 20 minutes, 25 minutes, or 30 minutes;
the weight retention rate measured after heating for the x time (a) is a percentage (%) of the weight of the aerogel composite measured after heating the aerogel composite at a temperature of 300° C. for the x time with respect to the weight of the aerogel composite before heating;
the average value of weight retention rates after heating (b) is an average value of weight retention rates obtained after heating the aerogel composite at a temperature of 300° C. for 5 minutes, 10 minutes, 15 minutes, 20 minutes, 25 minutes, and 30 minutes; and
A is a rational number ranging from −0.50 to +0.50,
wherein an amount of ammonia gas generated per unit weight of the aerogel composite is from 10 μg/g to 70 μg/g, measured after heating the aerogel composite at a temperature of 150° C. for 60 minutes.

2. The aerogel composite of claim 1, wherein the A is a rational number ranging from −0.30 to +0.30.

3. The aerogel composite of claim 1, wherein when the aerogel composite is heated at a temperature of 300° C. for 5 minutes and 60 minutes, an absolute value (B) of a change in weight retention rate of the aerogel composite per unit time satisfies Equation 3 below:

$$B = |\{(\text{Weight retention rate measured after heating for } y \text{ time}) - (\text{Weight retention rate measured after heating for } z \text{ time})\}/(y-z)| \quad [\text{Equation 3}]$$

wherein in Equation 3 above:
the y time is 5 minutes, and the z time is 60 minutes;
the weight retention rate measured after heating for the y time is a percentage (%) of the weight of the aerogel composite measured after heating the aerogel composite at a temperature of 300° C. for the y time with respect to the weight of the aerogel composite before heating;
the weight retention rate measured after heating for the z time is a percentage (%) of the weight of the aerogel composite measured after heating the aerogel composite at a temperature of 300° C. for the z time with respect to the weight of the aerogel composite before heating; and
B is a rational number ranging from $1.0 \times 10^{-3}$ to $4.0 \times 10^{-2}$.

4. The aerogel composite of claim 1, wherein when the aerogel composite is heated at a temperature of 300° C. for 5 minutes and 30 minutes, an absolute value (B) of the change in weight retention rate of the aerogel composite per unit time satisfies Equation 3 below:

$$B = |\{(\text{Weight retention rate measured after heating for } y \text{ time}) - (\text{Weight retention rate measured after heating for } z \text{ time})\}/(y-z)| \quad [\text{Equation 3}]$$

wherein in Equation 3 above:
the y time is 5 minutes, and the z time is 30 minutes;
the weight retention rate measured after heating for the y time is a percentage (%) of the weight of the aerogel composite measured after heating the aerogel composite at a temperature of 300° C. for the y time with respect to the weight of the aerogel composite before heating the same at 300° C.;
the weight retention rate measured after heating for the z time is a percentage (%) of the weight of the aerogel composite measured after heating the aerogel composite at a temperature of 300° C. for the z time with respect to the weight of the aerogel composite before heating the same at 300° C.; and
B is a rational number ranging from $1.0 \times 10^{-3}$ to $3.0 \times 10^{-2}$.

5. The aerogel composite of claim 1, wherein the aerogel composite has a moisture impregnation rate of 5 wt % or less, which is represented by Equation 4 below:

$$\text{Moisture impregnation rate (wt \%)} = \{(\text{Weight of specimen after impregnation} - \text{Weight of specimen before impregnation})/(\text{Weight of specimen before impregnation})\} \times 100 \quad [\text{Equation 4}]$$

wherein in Equation 4 above the weight of a specimen after impregnation is the weight measured after impregnating an aerogel composite specimen in distilled water at 21±2° C. for 15 minutes.

6. The aerogel composite of claim 5, wherein the aerogel composite has a moisture impregnation rate of 2 wt % or less.

7. The aerogel composite of claim 1, wherein in the aerogel composite, a weight retention rate measured after heating the aerogel composite at a temperature of 300° C. for 30 minutes is 97 wt % or greater.

8. The aerogel composite of claim 1, wherein in the aerogel composite, an average heat for sustained burning (Qsb) measured in accordance with ISO 5658-2 standard is 0.5 MJ/m$^2$ or greater.

9. The aerogel composite of claim 1, wherein in the aerogel composite, a critical flux at extinguishment (CHF) measured in accordance with ISO 5658-2 standard is 25 kW/m$^2$ or greater.

10. The aerogel composite of claim 1, wherein the aerogel composite has a thermal conductivity at room temperature (23±5° C.) of 15.0 mW/mK or less.

11. The aerogel composite of claim 1, wherein the aerogel composite has a thermal conductivity at 150° C. of 25.0 mW/mK or less.

12. The aerogel composite of claim 1, wherein the amount of ammonia gas generated per unit weight of the aerogel composite ranges from 10 μg/g to 50 μg/g.

13. The aerogel composite of claim 1, wherein ammonium bicarbonate ($NH_4HCO_3$) or ammonium carbonate (($NH_4)_2CO_3$) particles are included on the aerogel or in pores inside the aerogel.

14. The aerogel composite of claim 1, wherein the aerogel is a silica aerogel.

15. The aerogel composite of claim 1, wherein the fiber substrate is glass fiber substrate.

16. A heat insulation member comprising the aerogel composite of claim 1.

17. The heat insulation member of claim 16, wherein the heat insulation member further comprises a support member positioned on at least one surface of an upper surface or a lower surface of the aerogel composite.

18. The aerogel composite of claim 1, wherein the amount of ammonia gas generated per unit weight of the aerogel composite ranges from 15 μg/g to 40 μg/g.

19. The aerogel composite of claim 1, wherein the weight retention rate measured after heating the aerogel composite at a temperature of 300° C. for 60 minutes is 98 wt % or greater.

20. The aerogel composite of claim 1, wherein the weight retention rate measured after heating the aerogel composite at a temperature of 300° C. for 60 minutes is 99 wt % or greater.

* * * * *